(12) United States Patent
Lin

(10) Patent No.: US 11,848,601 B1
(45) Date of Patent: Dec. 19, 2023

(54) RIPPLE REDUCTION CIRCUIT FOR USE WITH A POWER SUPPLY

(71) Applicant: Renesas Design (UK) Limited, Bourne End (GB)

(72) Inventor: Yu-Chin Lin, Taipei (TW)

(73) Assignee: Renesas Design (UK) Limited, Bourne End (GB)

( * ) Notice: Subject to any disclaimer, the term of this patent is extended or adjusted under 35 U.S.C. 154(b) by 0 days.

(21) Appl. No.: 17/828,159

(22) Filed: May 31, 2022

(51) Int. Cl.
| | | |
|---|---|---|
| *H02M 1/14* | (2006.01) | |
| *H02M 1/42* | (2007.01) | |
| *H05B 45/36* | (2020.01) | |
| *H05B 45/355* | (2020.01) | |
| *H05B 45/3725* | (2020.01) | |

(52) U.S. Cl.
CPC ......... *H02M 1/143* (2013.01); *H02M 1/4258* (2013.01); *H05B 45/355* (2020.01); *H05B 45/36* (2020.01); *H05B 45/3725* (2020.01)

(58) Field of Classification Search
CPC .. H02M 1/143; H02M 1/4258; H05B 45/355; H05B 45/36; H05B 45/3725
See application file for complete search history.

(56) References Cited

U.S. PATENT DOCUMENTS

| 10,015,849 | B2 | 7/2018 | Liu | |
|---|---|---|---|---|
| 2014/0176017 | A1* | 6/2014 | Kuang | H05B 45/37 |
| | | | | 315/307 |
| 2015/0340944 | A1* | 11/2015 | Lin | H02M 1/14 |
| | | | | 315/246 |
| 2017/0181234 | A1* | 6/2017 | Huang | G05F 1/56 |
| 2018/0235043 | A1* | 8/2018 | Chen | H05B 45/3578 |

FOREIGN PATENT DOCUMENTS

CN 106132031 A * 11/2016 ............. H05B 45/44

* cited by examiner

*Primary Examiner* — Renan Luque
(74) *Attorney, Agent, or Firm* — SCULLY, SCOTT, MURPHY & PRESSER, P.C.

(57) ABSTRACT

A ripple reduction circuit for use with an AC/DC power supply providing an output voltage to a load is presented. The ripple reduction circuit includes an input terminal for receiving the output voltage and a low pass filter. The low pass filter is used to filter an AC component of the output voltage to obtain a filtered DC voltage. The ripple reduction circuit generates a reference current based on the filtered DC voltage and a control voltage having an AC component in phase with the AC component of the output voltage.

19 Claims, 15 Drawing Sheets

RIPPLE REDUCTION CIRCUIT FOR USE WITH A POWER SUPPLY

TECHNICAL FIELD

The present disclosure relates to a ripple reduction circuit and a power supply with power factor correction provided with the ripple reduction circuit.

BACKGROUND

AC/DC power supplies transform an AC input into a DC output voltage. This is usually achieved using a rectifier coupled to a transformer, hence forming an isolated power supply. Isolated AC/DC switching power converters can be used to provide regulated power to an electronic device while providing galvanic isolation between the electronic device and an AC power source. The transformer provides galvanic isolation, and components which are coupled with the primary winding are collectively referred to as the primary side of the power converter circuit, while components which are coupled with the secondary winding are collectively referred to as the secondary side of the power converter circuit. The output provides a regulated voltage for an output load.

An important figure of merit of such power supplies is the power factor defined as the ratio of the real power transmitted to the load over the apparent power received by the converter from the input source. International organizations like the EU have setup regulations which define the minimum power factor or maximum level of harmonics a device must have in order to be sold in the European market. Reactive circuit elements such as inductors and capacitors can lower the power factor of the converter. To improve the power factor, AC/DC power supplies are often provided with a power factor correction (PFC) and referred to as PFC converters.

Existing AC/DC power supplies are limited by significant current oscillations and/or relatively complex designs, hence limiting their applications.

It is an object of the disclosure to address one or more of the above mentioned limitations.

SUMMARY

According to a first aspect of the disclosure, there is provided a ripple reduction circuit for use with an AC/DC power supply providing an output voltage to a load, the ripple reduction circuit comprising an input terminal for receiving the output voltage; a low pass filter adapted to filter an AC component of the output voltage to obtain a filtered DC voltage; wherein the ripple reduction circuit is adapted to generate a reference current based on the filtered DC voltage and to generate a control voltage having an AC component in phase with the AC component of the output voltage.

Optionally, the load is provided between a first output terminal and a second output terminal, the ripple reduction circuit comprising a linear voltage regulator adapted to regulate a voltage at the second output terminal based on the control voltage.

Optionally, the linear voltage regulator is a low dropout regulator.

Optionally, the voltage at the second output terminal is equal to the control voltage.

Optionally, the low dropout regulator comprises an operational amplifier coupled to a switch.

Optionally, the ripple reduction circuit comprises a current mirror circuit adapted to generate the reference current, wherein the reference current has a first current component and a second current component.

Optionally, wherein the first current component is fixed, and the second current component is variable based on an output of the low pass filter.

Optionally, wherein the current mirror circuit comprises a first switch coupled to the low pass filter via a first resistance and a second switch coupled to the input terminal via a second resistance or via the load.

Optionally, wherein the current mirror circuit comprises a third resistance coupled to a voltage source configured to provide a reference voltage, wherein the third resistance is coupled to a control terminal of the first switch and a control terminal of the second switch.

Optionally, wherein the low pass filter has a time constant greater than a predetermined ripple period of the output voltage.

According to a second aspect of the disclosure, there is provided an AC/DC power supply comprising a power factor correction converter coupled to a ripple reduction circuit according to the first aspect.

Optionally, the power factor correction converter comprises a rectifier coupled to transformer having a primary winding and a secondary winding, a switch coupled to the primary winding and a power factor controller coupled to the switch, wherein the power factor correction converter is operable in at least one of a constant voltage mode and a constant current mode.

Optionally, the power factor correction converter is adapted to provide a variable output voltage.

The AC/DC power supply according to the second aspect of the disclosure may comprise any of the features described above in relation to the ripple reduction circuit according to the first aspect of the disclosure.

According to a third aspect of the disclosure there is provided a method for reducing ripples of an AC/DC power supply providing an output voltage to a load, the method comprising receiving the output voltage from the AC/DC power supply;
filtering with a low pass filter an AC component of the output voltage to obtain a filtered DC voltage;
generating a reference current based on the filtered DC voltage; and
generating a control voltage having an AC component in phase with the AC component of the output voltage.

Optionally, the load is provided between a first output terminal and a second output terminal, the method comprising regulating a voltage at the second output terminal based on the control voltage.

Optionally, the output voltage varies over an output range, and wherein ripples of a load output voltage or a load output current are substantially reduced or cancelled across the output range.

Optionally, wherein the reference current has a first current component and a second current component, wherein the first current component is fixed, and the second current component is variable based on an output of the low pass filter.

Optionally, the method comprises subtracting the DC component of the output voltage to obtain the control voltage.

Optionally, the method comprises generating the control voltage using the reference current and the output voltage.

The method of the third aspect may share features of the first and second aspects, as noted above and herein.

According to a fourth aspect of the disclosure there is provided an LED driver comprising an AC/DC power supply according to the second aspect of the disclosure.

DESCRIPTION OF THE DRAWINGS

The disclosure is described in further detail below by way of example and with reference to the accompanying drawings, in which.

DESCRIPTION

Figure 1A:
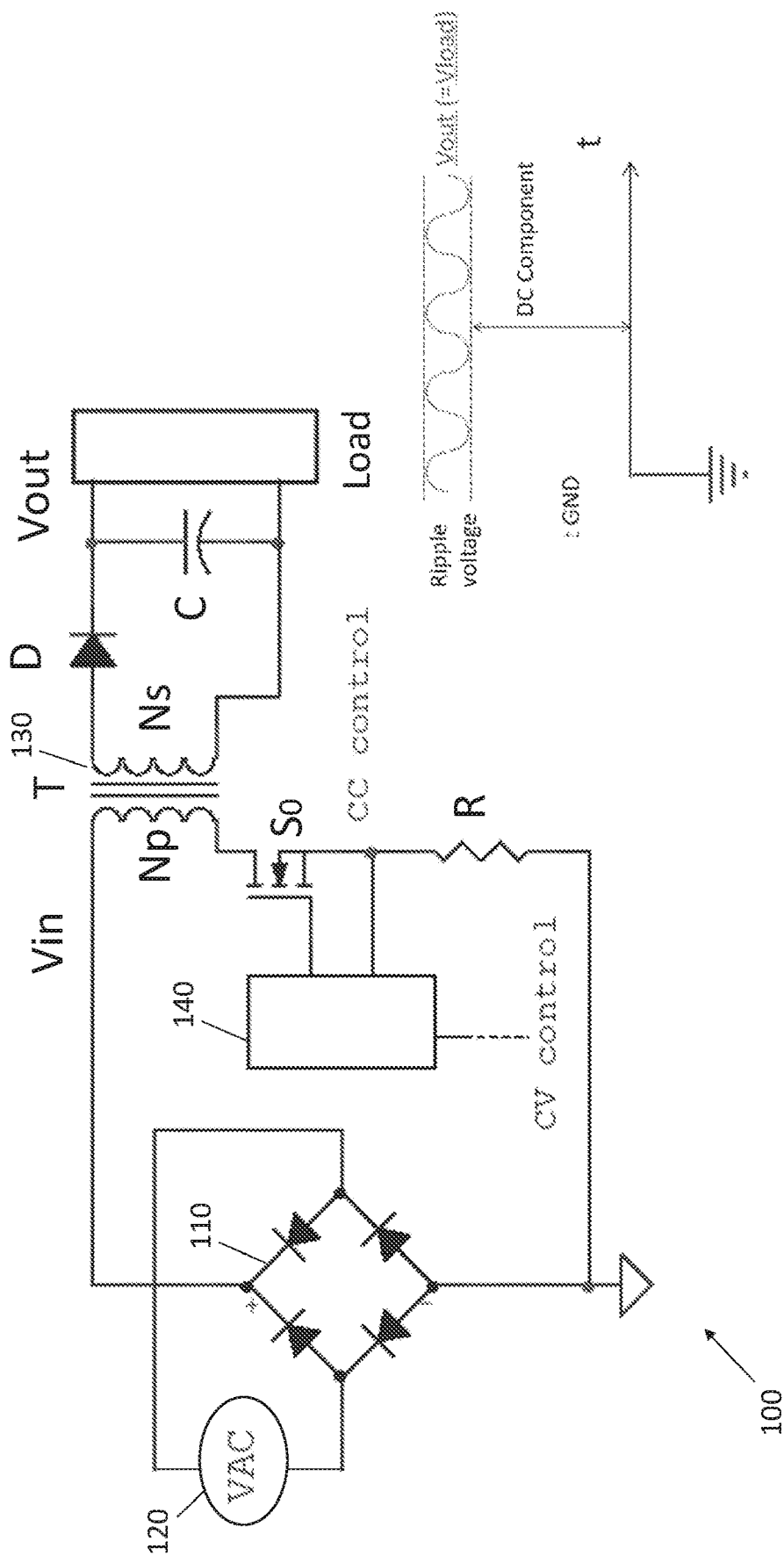
FIG. 1A is a diagram of a conventional AC/DC switching converter with power factor correction.

FIG. 1A illustrates a conventional AC/DC isolated switching converter 100 with power factor correction. The PFC converter 100 has a full-bridge rectifier 110 coupled at one end to an AC voltage source 120 and at the other another end to a transformer T 130 having a primary winding $N_P$ and a secondary winding $N_S$. The primary winding $N_P$ is coupled at one end to the rectifier 110 for receiving a rectified input voltage Vin, and at the other end to ground via a switch $S_0$ and a resistance R. A primary side controller 140 is coupled to the switch $S_0$. The primary side controller 140 is configured to perform power factor correction by implementing constant current CC and/or constant voltage CV control. The primary side controller 140 is also referred to as PFC controller. The secondary side $N_s$ of the transformer T is coupled to an output capacitor C via a diode D. To meet power factor regulations (ex: required P.F.>0.9), the converter 100 is designed with almost zero bulk capacitor (input or filter capacitor) after the bridge rectifier.

Figure 1B:
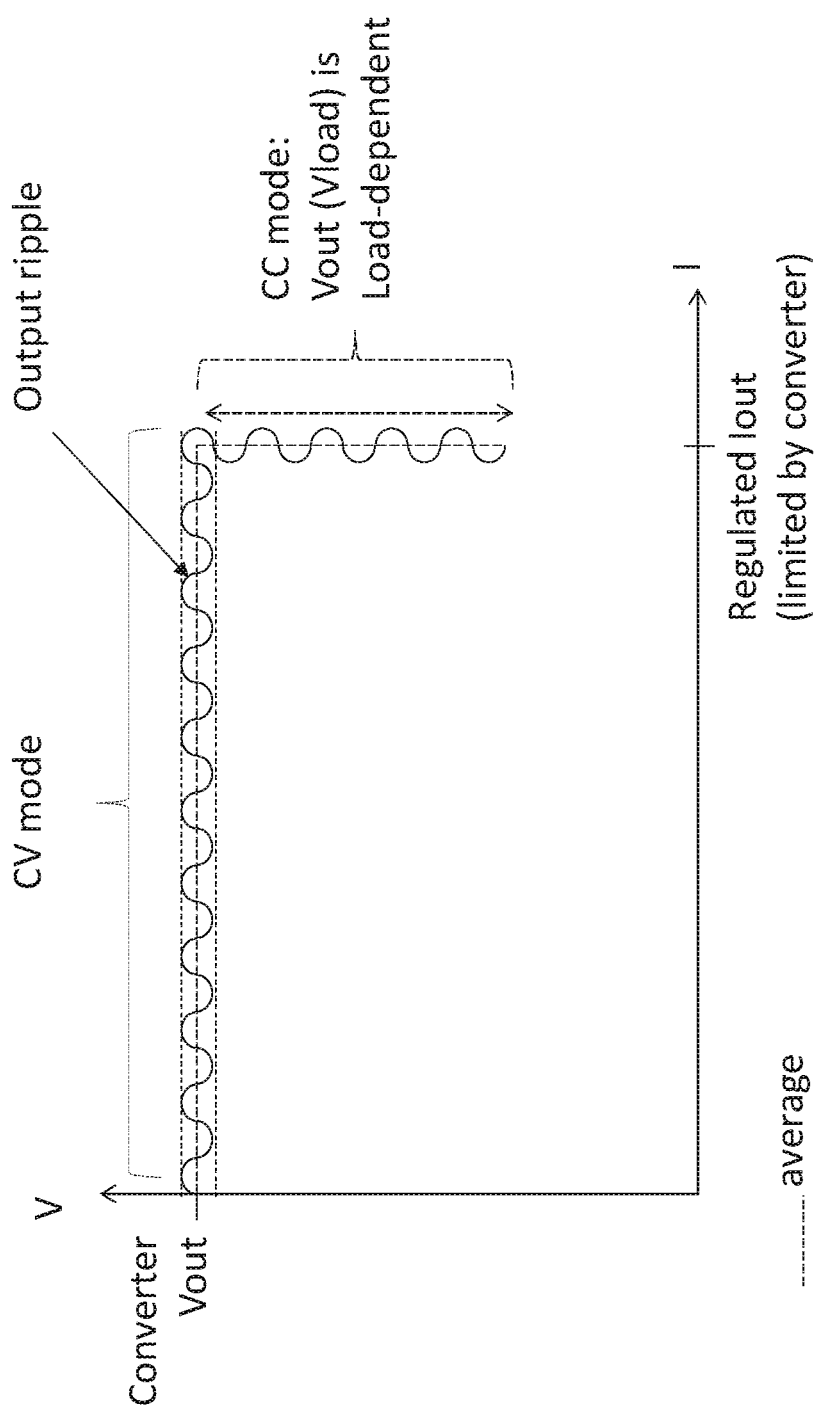
FIG. 1B is a diagram illustrating the operation of the PFC converter of FIG. 1.

FIG. 1B is a diagram illustrating the operation of the PFC converter of FIG. 1. FIG. 1B shows the output voltage Vout and the output current Iout in CV mode and CC mode, respectively. Both the output voltage and the output current show ripples. The converter output voltage and output current are regulated by the PFC controller 140 at the primary side.

Figure 2:
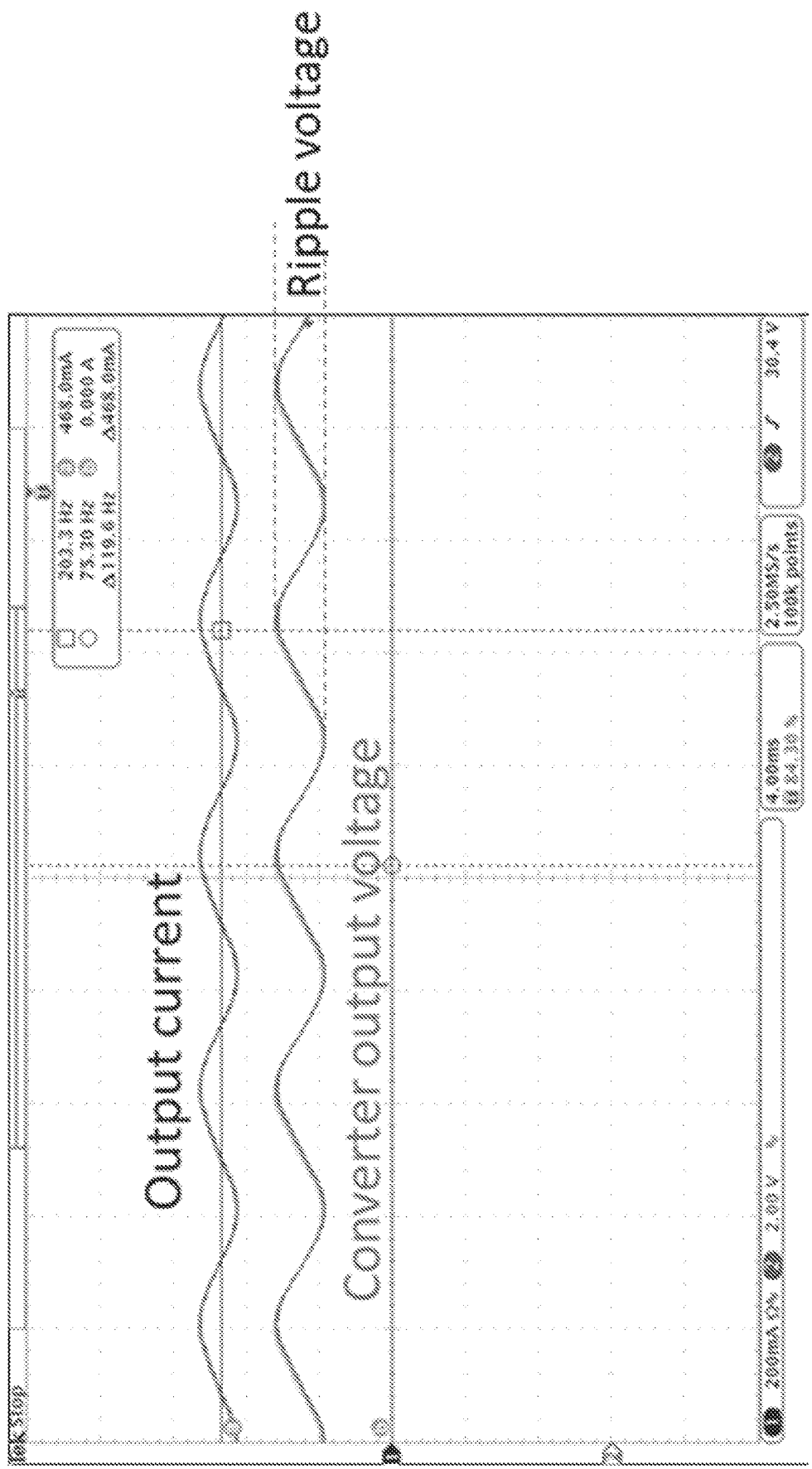
FIG. 2 is a simulation of the output current and the output voltage of the converter of FIG. 1A.

FIG. 2 is a simulation showing the output current and the output voltage of the converter of FIG. 1A. The output voltage Vout has significant ripple oscillations at twice the AC line frequency, for instance 2×50 Hz or 2×60 Hz. Such ripples may affect the control and functionality of some devices including LEDs, for instance leading to flickering.

Figure 3:
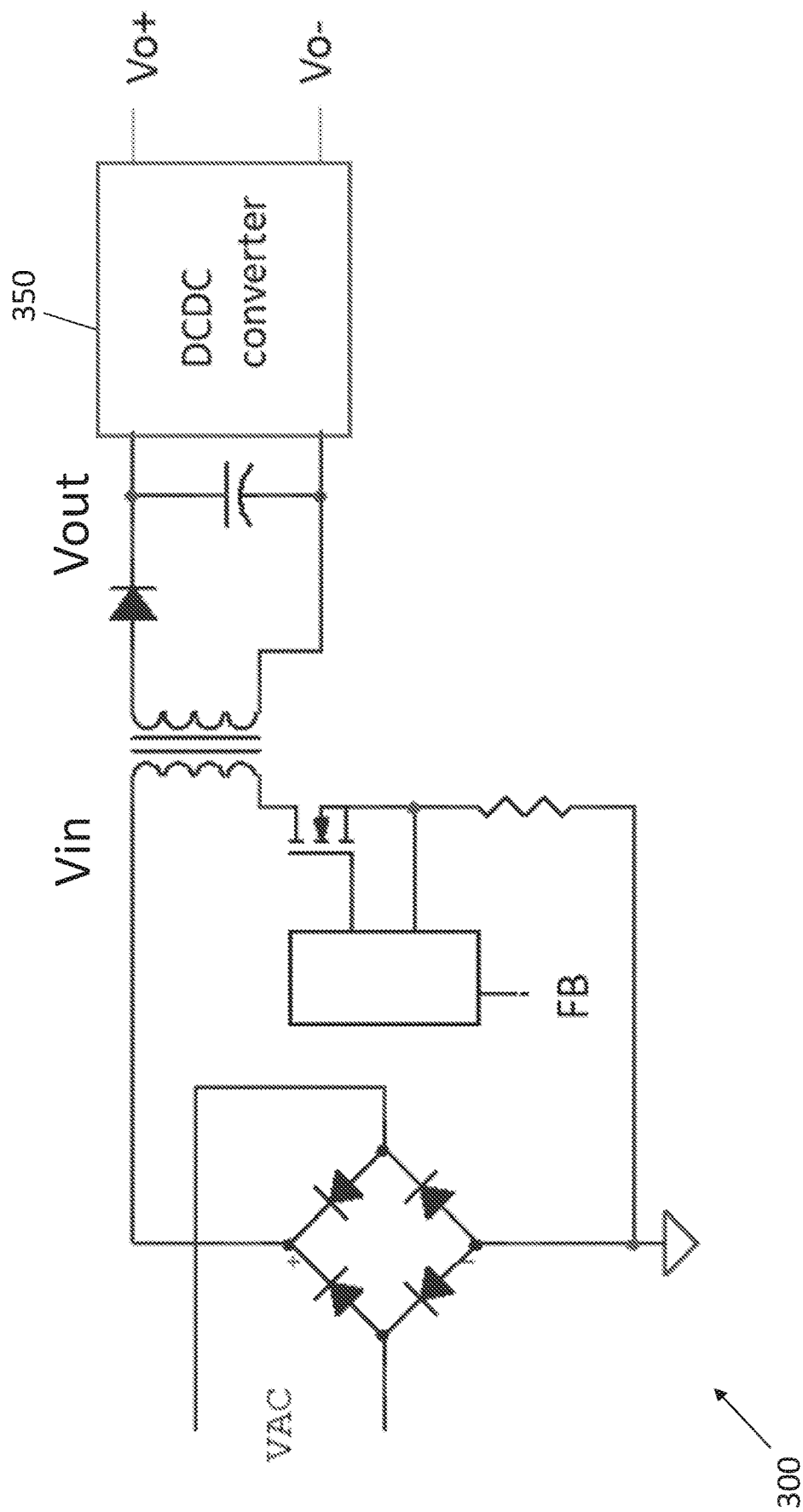
FIG. 3 is a diagram of an AC/DC converter provided with a DC-DC converter output stage according to the prior art.

FIG. 3 is a diagram of an AC/DC converter provided with a DC-DC converter output stage according to the prior art. The converter 300 is similar to the PFC converter 100 of FIG. 1, however in this case a DC-DC converter is provided as second stage to provide stable and ripple-free DC voltage.

Figure 4:
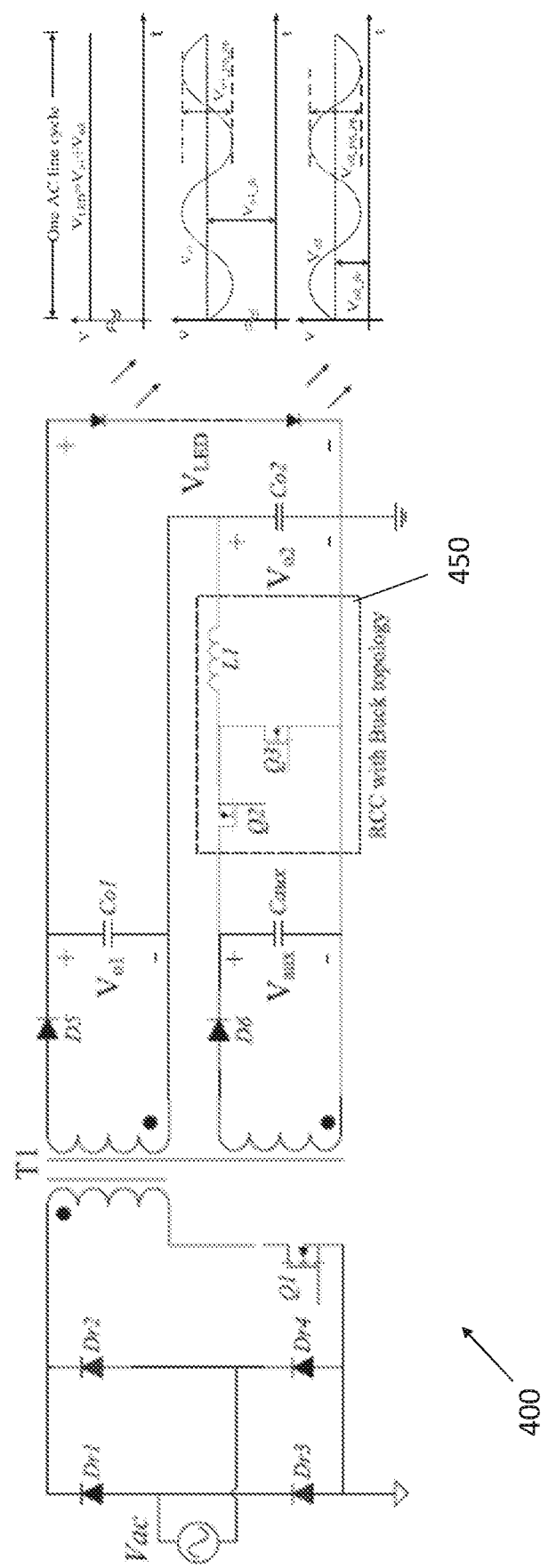
FIG. 4 is a diagram of an AC/DC converter provided with a ripple cancellation converter according to the prior art.

FIG. 4 is a diagram of an AC/DC converter provided with a ripple cancellation converter (RCC) as described in U.S. Ser. No. 10/015,849. In this example the transformer has a two secondary windings providing two outputs. An active RCC Buck converter is used on the second output to generate a reverse-phase ripple voltage. This approach achieves output ripple compensation.

Figure 5:
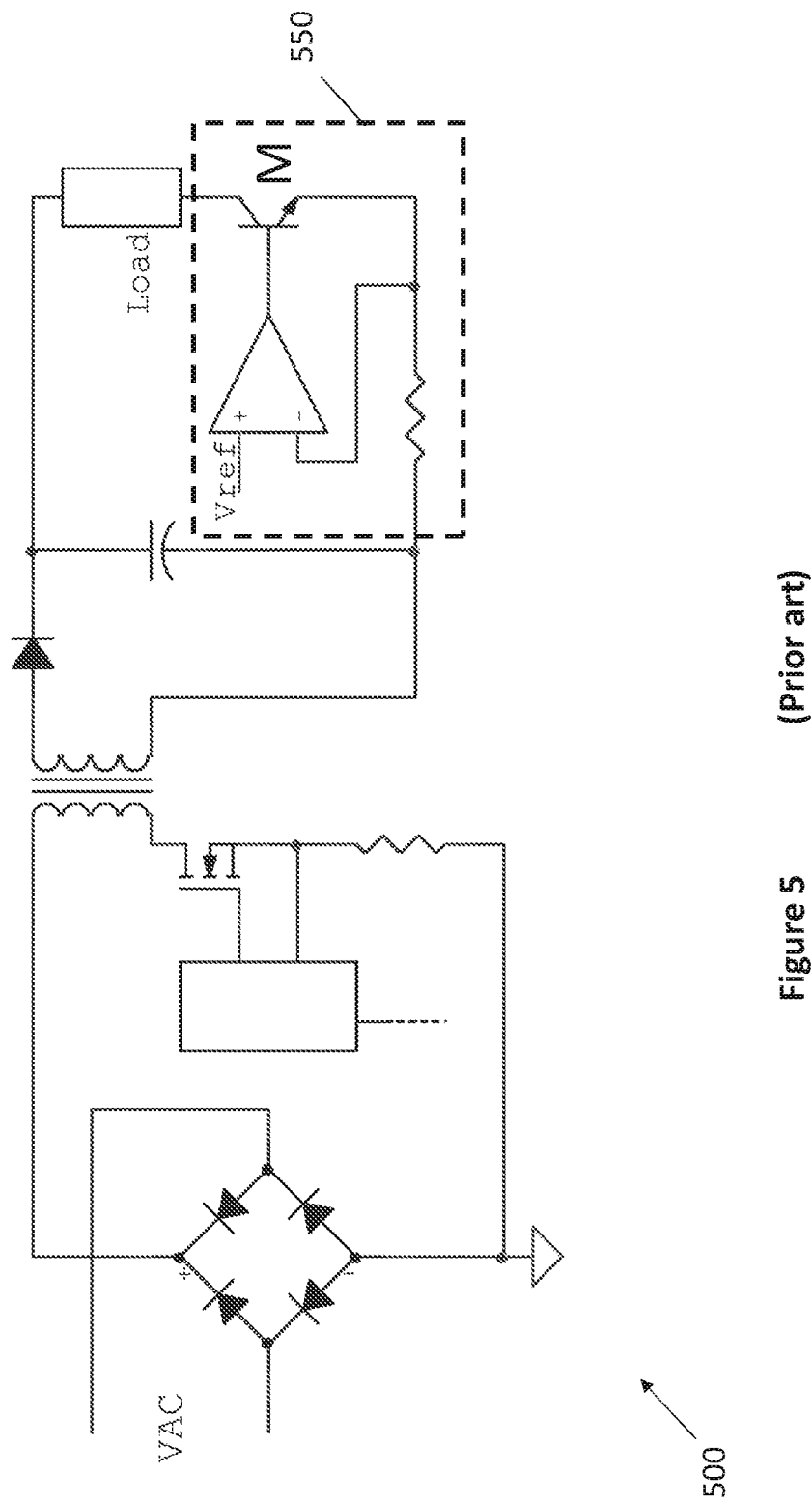
FIG. 5 is a diagram of an AC/DC converter provided with a constant current regulator, according to the prior art.

FIG. 5 is a diagram of an AC/DC converter provided with a constant current regulator, according to the prior art. The converter 500 is similar to the PFC converter 100 of FIG. 1, however in this case a constant current CC regulator 550 is provided at the output. The CC regulator 550 is formed of an operational amplifier having its output connected to a transistor M. The circuit 500 suppresses output ripples but can only be operated under specified CC condition. Since the load voltage under regulated current might be much lower than the converter output, the transistor M may dissipate significant power. For instance, if the load voltage is 30V and the converter output is 40V, then the transistor M would have to lose 10V through power dissipation.

Figure 6:
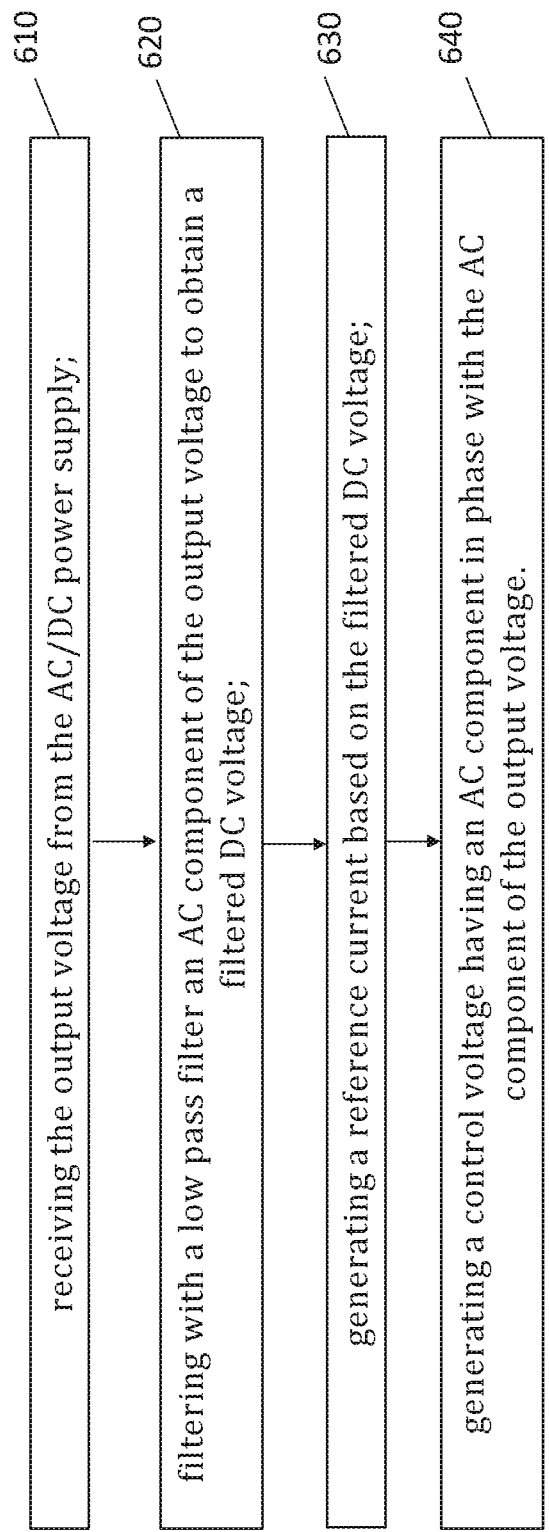
FIG. 6 is a flow chart of a method for reducing output oscillations of an AC/DC power supply, according to the disclosure.

FIG. 6 is a flow chart of a method for reducing output oscillations (ripples) of an AC/DC power supply, according to the disclosure. The power supply is used to provide an output voltage to a load.

At step 610 the output voltage is received from the AC/DC power supply. The output voltage has a DC component and an AC component also referred to as residual AC component, or ripple component.

At step 620 the AC component of the output voltage is filtered with a low pass filter to obtain a filtered DC component.

At step 630 a reference current is generated based on the filtered DC voltage. For instance, the reference current may have a first current component and a second current component, the first current component being fixed, and the second current component being variable based on an output of the low pass filter.

At step 640 a control voltage having an AC component in phase with the AC component of the output voltage is generated. For instance the control voltage may be generated using the reference current and the output voltage.

Using the proposed method, a load voltage across the load can be provided with no or greatly reduced voltage ripples.

Figure 7A:
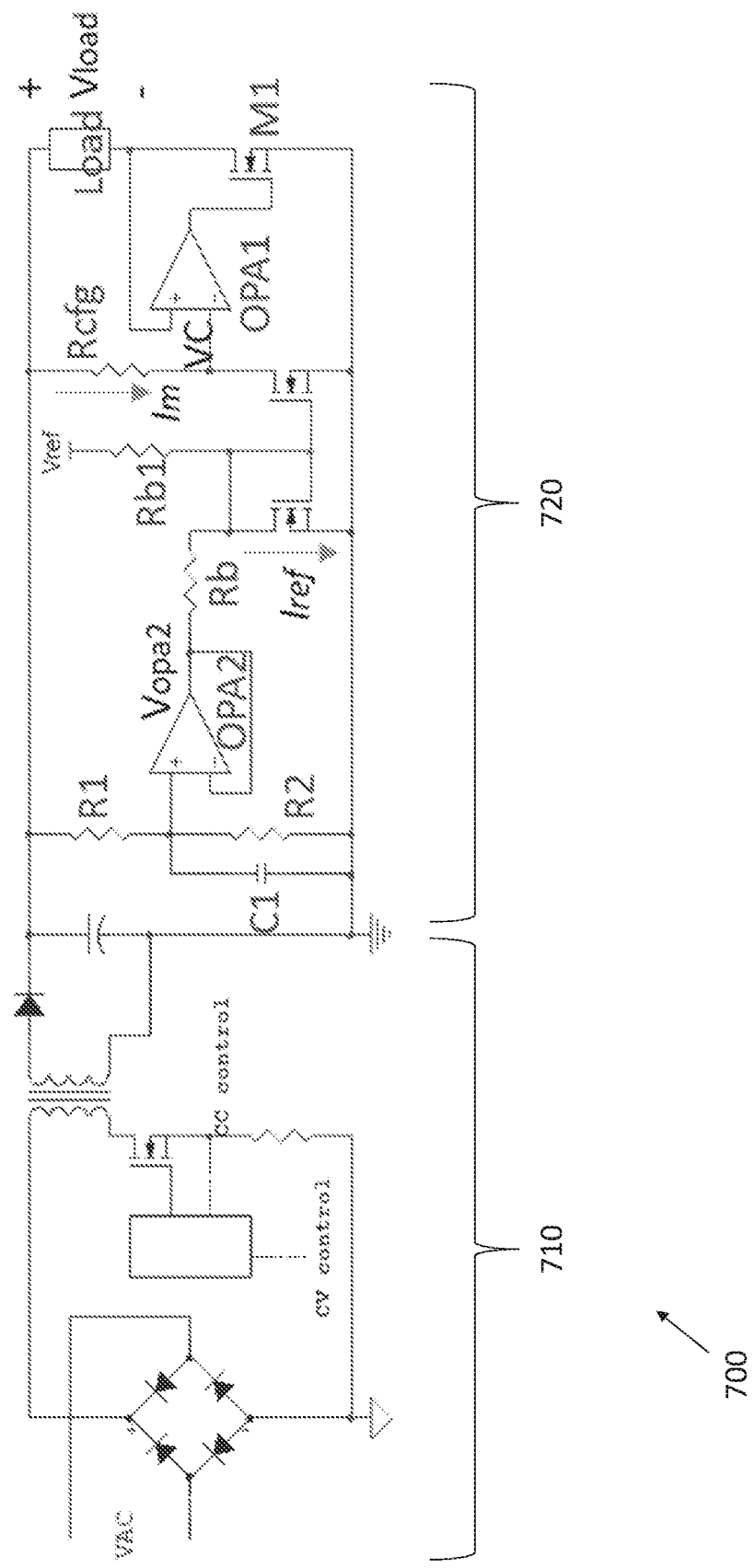
FIG. 7A is a diagram of an AC/DC power supply provided with a ripple reduction circuit according to the disclosure.

FIG. 7A illustrates an AC/DC power converter for implementing the method of FIG. 6.

The power converter 700 includes a PFC converter 710 coupled to a ripple reduction circuit 720.

Figure 7B:
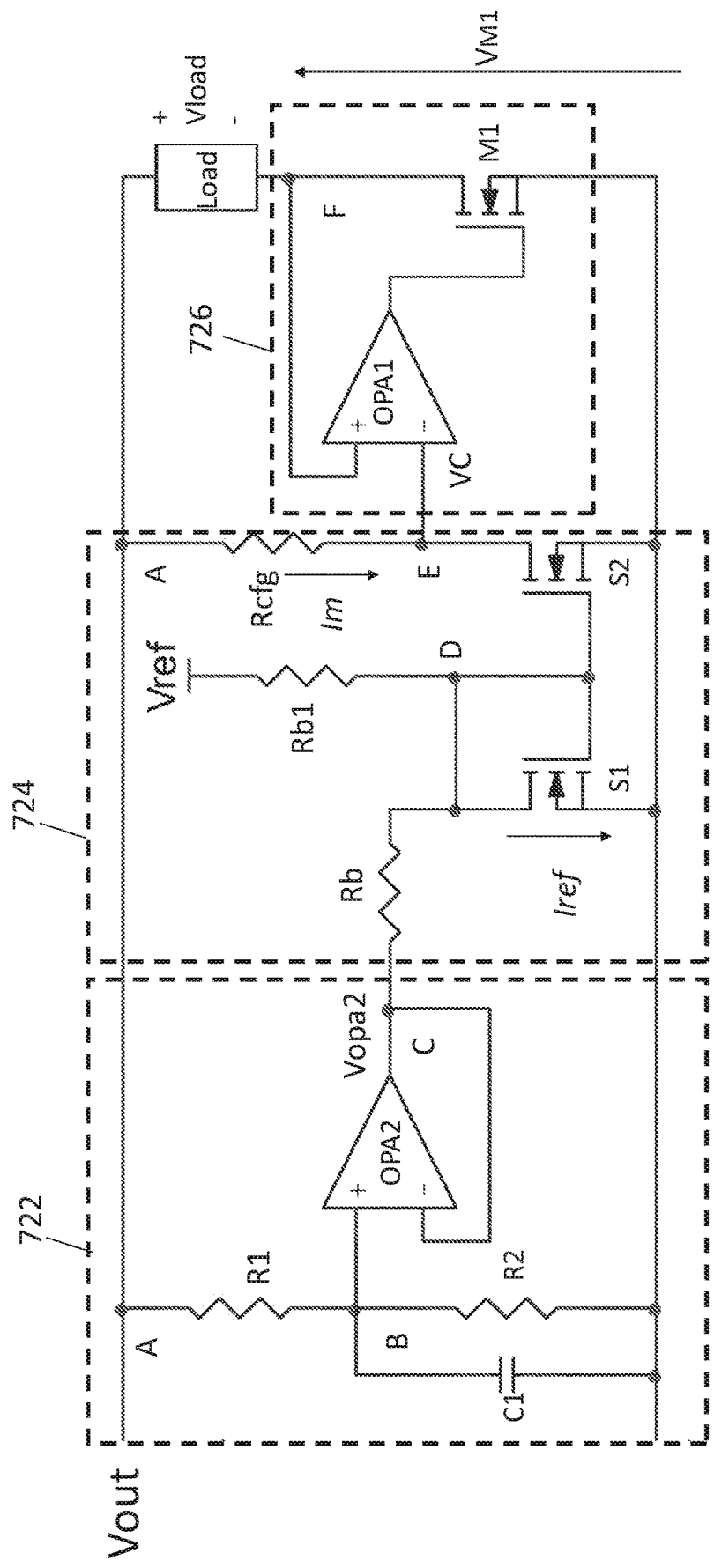
FIG. 7B is a diagram of the ripple reduction circuit of FIG. 7A.

FIG. 7B is diagram of the ripple reduction circuit of FIG. 7A. The ripple reduction circuit 720 comprises a low pass filter 722, a current mirror circuit 724 and a linear voltage regulator 726.

The low pass filter 722 is formed of an operational amplifier OPA2, two resistances R1 and R2 and a capacitor C1. The operational amplifier OPA2 has an inverting input couple to its output at node C, and a non-inverting input couple to ground via the capacitor C1 at node B. The resistance R1 is provided between node A and node B, and the second resistance R2 between node B and ground.

The current mirror circuit 724 includes a pair of transistors S1 and S2 having a common gate terminal at node D. The transistor S1 has a drain terminal coupled to a resistance Rb, and a source terminal coupled to ground. The transistor S2 has a drain terminal coupled a resistance Rcfg at node E, and a source terminal coupled to ground. The resistance Rcfg is coupled to node A. The gate of S1 and S2 is coupled to a reference voltage Vref via resistance Rb1. The drain of S1 is coupled to the gate of S1, S2 at node D.

The linear voltage regulator 726 is implemented as a low dropout regulator made of operational amplifier OPA1 and transistor M1. The operational amplifier OPA1 has an inverting input couple to node E, a non-inverting input couple to the drain terminal of M1, and an output coupled to the gate terminal of M1. The load is provided between a first output terminal (positive terminal) and a second output terminal (negative terminal). In the circuit of FIG. 7B the linear voltage regulator 726 is provided at the second output terminal. It will be appreciated that in an alternative implementation the linear voltage regulator may be provided at the first output terminal.

In operation the PFC converter 710 generates an output voltage Vout. Since the primary side of the AC/DC converter is being operated in a power factor correcting mode, Vout has a relatively large ripple component. The voltage Vout is received at node A. The low pass filter LPF circuit 722 filters out or averages the AC frequency component of Vout (ripple frequency component), to produce the DC voltage Vopa2 at node C. This permits the DC component of the output voltage Vout to be detected and translated through the current mirror circuit 724 with Rcfg establishing a gain factor. The current mirror circuit 724 receives Vopa2 and generates a control voltage Vc at node E. The control voltage Vc is then used as a reference voltage for the linear voltage regulator 726. The control voltage Vc is defined by equation (1) below. The linear voltage regulator 726 regulates the voltage Vf at the negative side of the load so that Vc=Vf.

In more detail, the current $I_m$ through $R_{cfg}$ is mirrored from the reference current $I_{ref}$ through S1; therefore the control voltage Vc can be expressed as:

$$Vc = V_{out} - (I_{ref} * R_{cfg}) \quad (1)$$

The control voltage Vc can be adjusted to be consistent with different Vout values.

The linear voltage regulator 726 operates to deliver a constant voltage $V_{M1}$ at node F. The voltage $V_{M1}$ is regulated to follow Vc.

The control voltage Vc should be selected above the saturation voltage level, $V_{sat\_min}$, so that M1 operates in the saturation region.

Since $V_{M1}$ is regulated to follow the Vc, $V_{M1}$=Vc. Consequently, the load voltage $V_{load}$ can be expressed as:

$$V_{load} = I_m * R_{cfg} = I_{ref} * R_{cfg} \quad (2)$$

The control voltage Vc can also be expressed as the sum of $V_{sat\_min}$ with the ripple voltage of Vout, $V_{ripple}$ as:

$$Vc = V_{sat\_min} + V_{ripple} \quad (3)$$

$$V_{out} = V_{sat\_min} + V_{ripple} + V_{load} \quad (4)$$

The reference current $I_{ref} = I_{Rb1} + I_{Rb}$, in which $I_{Rb1}$ is the current through $R_{b1}$, and $I_{Rb}$ is the current through $R_b$.

The current $R_{b1}$ is a fixed bias current equal to $V_{ref}/R_{b1}$, and the current $I_{Rb}$ is a variable current equal to $V_{opa2}/R_b$. Since $V_{opa2}$ is proportional to Vout, then $I_{ref}$ varies dynamically. If Vout increases, then $V_{opa2}$ increases and $I_{ref}$ increases.

However the reference current Iref does not vary linearity with Vout. This is due to the gate voltage Vgate of current mirror which has a constant value. The current $I_{Rb1}$ is added to compensate for this non-linearity. In addition, $I_{Rb1}$ also dilutes the effect from remaining ripple component of Iref due to components of the low pass filter. The current $I_{Rb1}$ (hence the corresponding valued of $V_{ref}$ and $R_{b1}$) can be selected to allow the control voltage Vc to be consistent with the selected Vout output range.

The output $V_{opa2}$ of the low pass filter 722 is proportional to $V_{out}$ and scaled down by a factor N. The time constant $Tc = ((R_1 * R_2)/(R_1 + R_2)) * C_1$ is designed to be greater than the max ripple period of the power factor correction PFC converter output ripple. For instance it may be chosen to be 5 times greater.

For example Tc>50 mS and the LPF 722 passes frequencies below 20 Hz. This provides a steady input to the OPA2 while providing sufficient response time.

For applications including LED lighting and charger, the power converter does not require a very fast response.

Figure 7C:
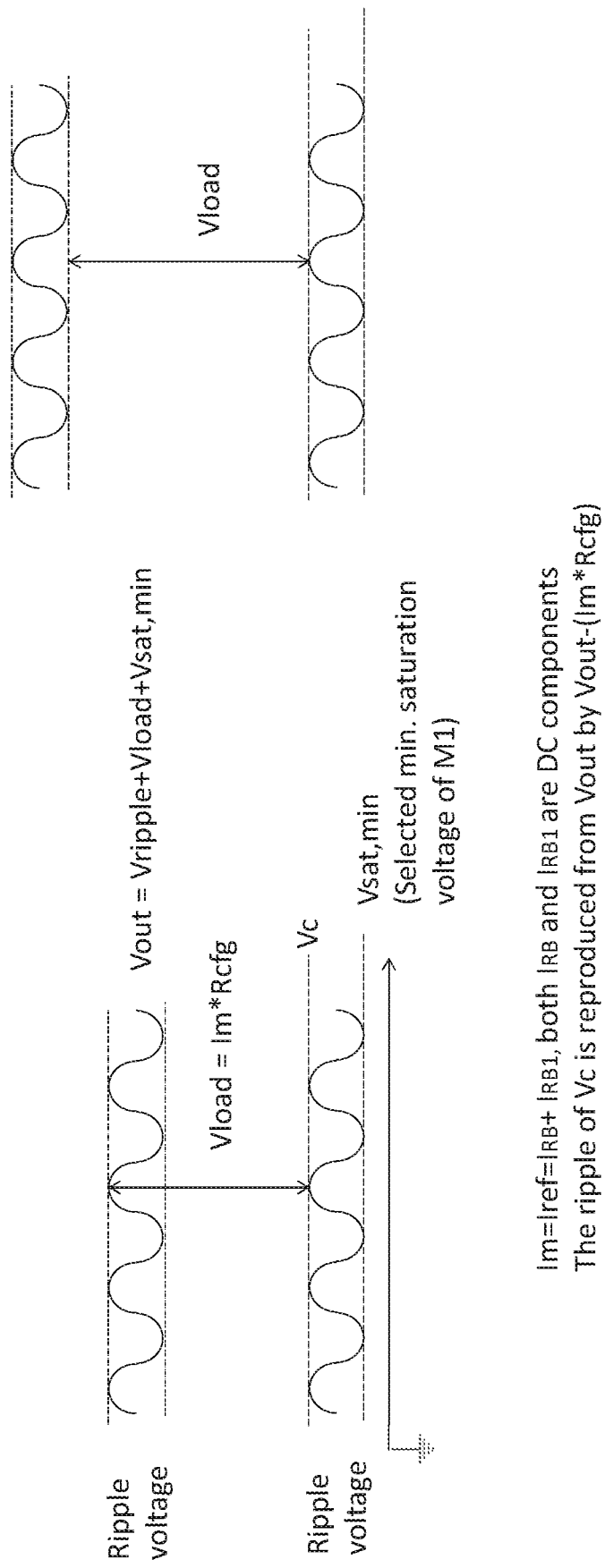
FIG. 7C is a diagram illustrating the operation of the ripple reduction circuit of FIG. 7B.

FIG. 7C is a diagram illustrating the load voltage for different values of the output voltage. The oscillations (ripples) of the output voltage Vout at the positive terminal of the load are in phase with the oscillations of the voltage $V_{M1}$ at the negative terminal of the load. Consequently the oscillations of the voltage Vload across the load are cancelled or greatly reduced.

In a numerical example, to cover a typical $V_{out}$ range of 25V~35V, $R_{cfg}$ and $I_{ref}$ have the following values:

$$R_{cfg} = (25V - VC)/I_{ref@25V} = (35V - VC)/I_{ref@35V}$$

$$I_{ref@25V} = (V_{ref} - V_{gs})/R_{b1} + (25V/N - V_{gs})/R_b$$

$$I_{ref@35V} = (V_{ref} - V_{gs})/R_{b1} + (35V/N - V_{gs})/R_b$$

Assuming that VC is set to 2.5V for output range, 25V~35V, $V_{gs}$ of current mirror is 1V, $V_{ref}$=5V, $R_b$=2 kΩ, $R_{b1}$=10.7 kΩ and N=10 (i.e. $R_1$=9*$R_2$), one would obtain:

$$R_{cfg} = 20 k\Omega$$

$$I_{ref@25V} = 1.124 \text{ mA}$$

$$I_{ref@35V} = 1.624 \text{ mA}$$

N is Vout scale down factor equal to R1+R2. In the above example $R_1$=9*$R_2$, and $Vopa2 = (R_2/(R_1+R_2)) V_{out} = V_{out}/10$.

Figure 8:
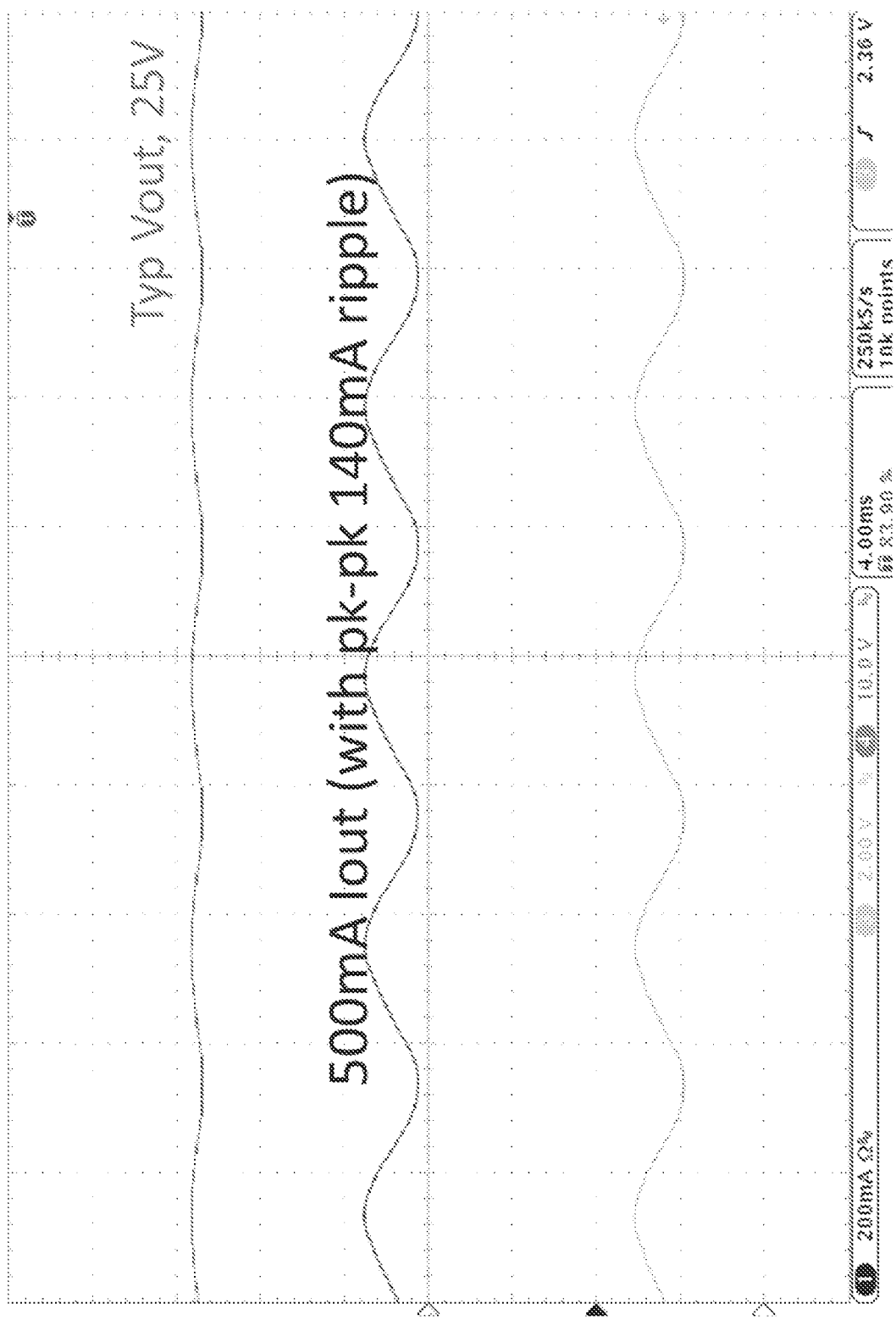
FIG. 8 is a simulation showing the output voltage and output current of the PCF converter of FIG. 7A when the ripple reduction circuit is not provided at the output.

FIG. 8 is a simulation showing the waveforms of the output voltage Vout of the PCF converter 710, and the load current Iout when the ripple reduction circuit 720 is not provided at the output. For an output voltage Vout=25V, the load current Iout has a peak to peak ripple of 140 mA.

Figure 9:
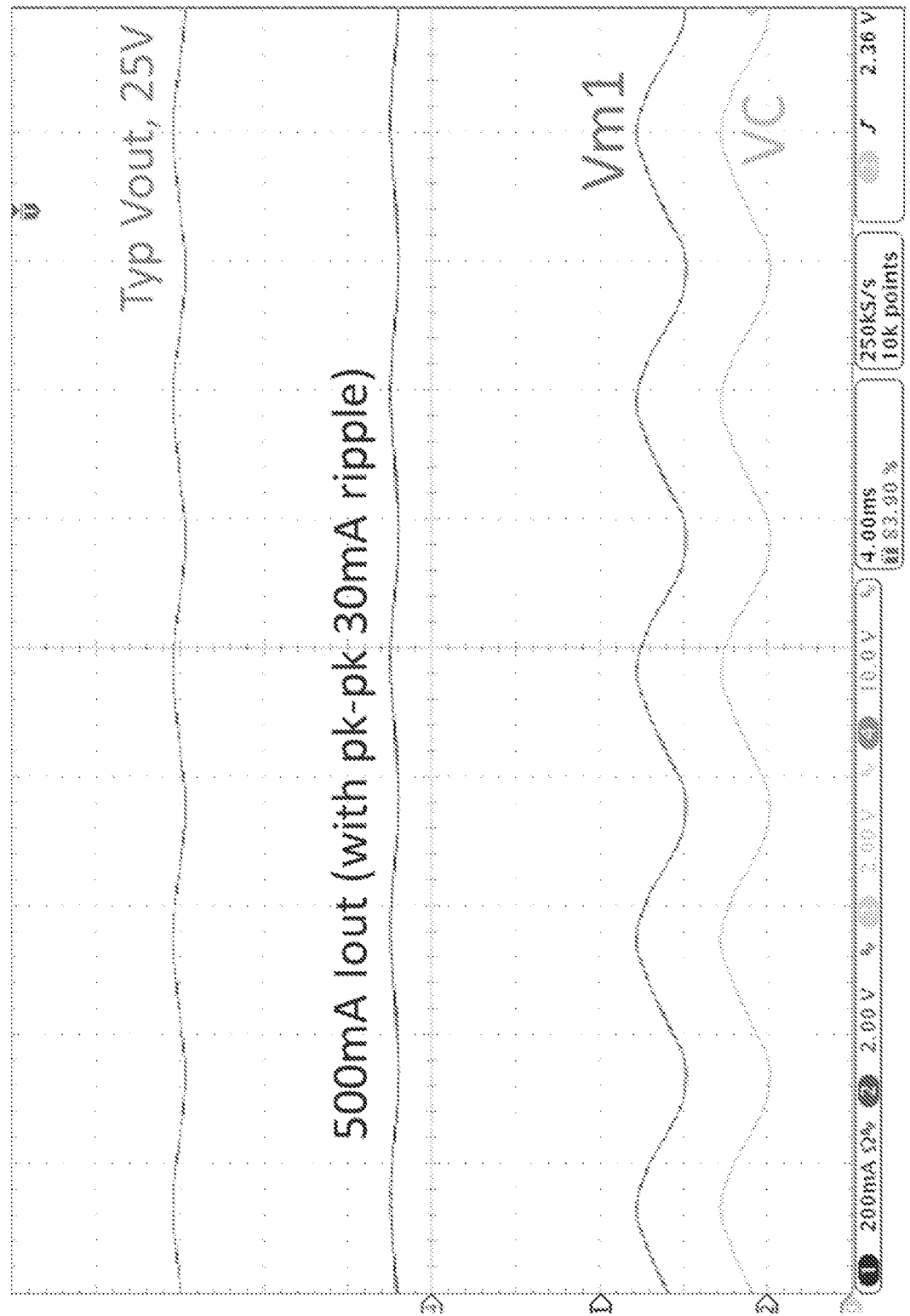
FIG. 9 is a simulation showing the waveforms of the circuit of FIG. 7A provided with the ripple reduction circuit obtained for an output voltage of 25V.

FIG. 9 is a simulation showing the waveforms of the circuit of FIG. 7 provided with the ripple reduction circuit 720. The simulation shows the output voltage Vout, the load current Iout, the control voltage Vc and the voltage across the transistor M1. For an output voltage Vout=25V, the load current Iout has a peak to peak ripple of 30 mA. The voltage Vc is identical to the voltage $V_{M1}$. The oscillations/ripples of Vc are in phase with the oscillations/ripples of $V_{M1}$.

Figure 10:
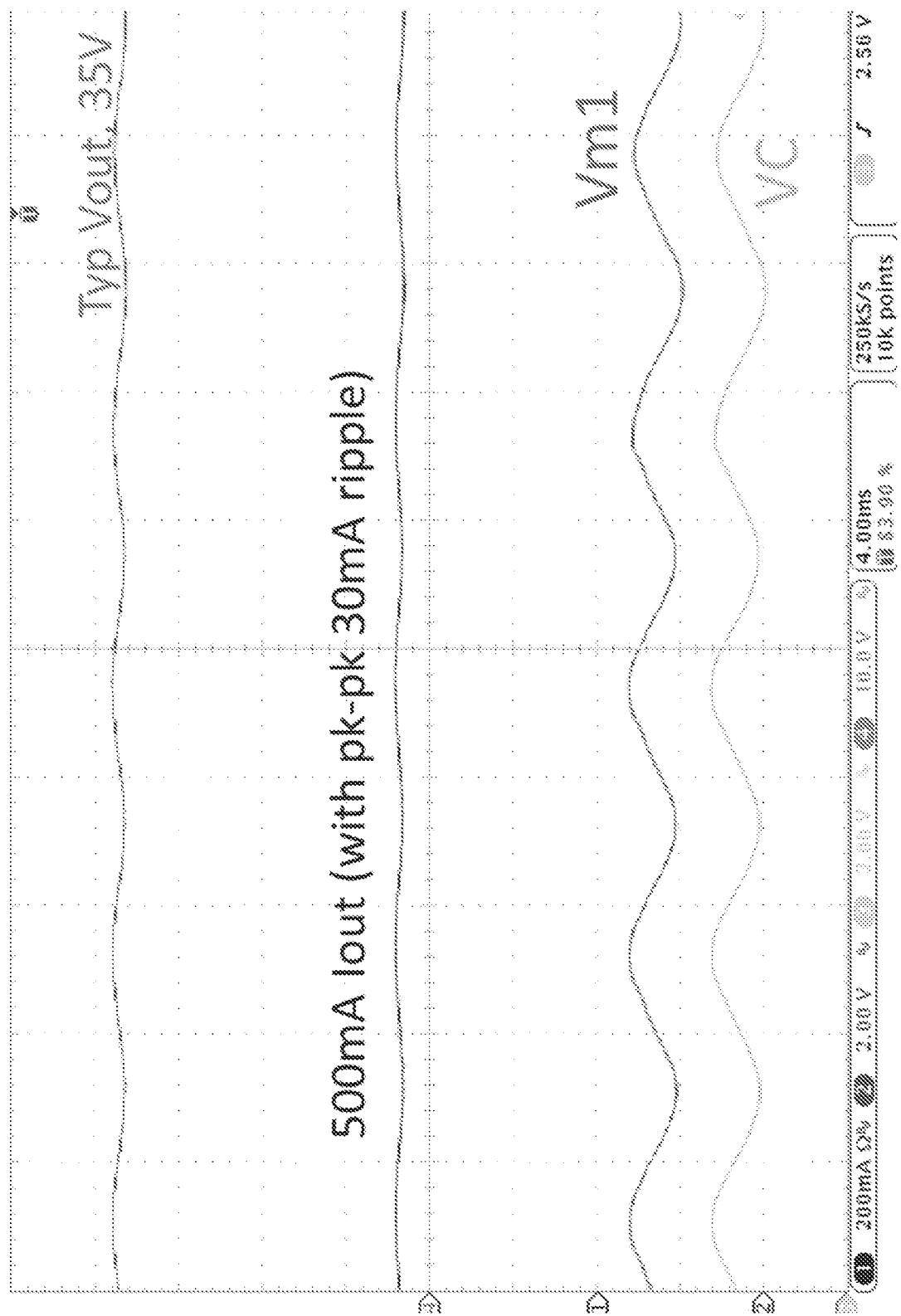
FIG. 10 is a simulation showing the waveforms of the circuit of FIG. 7A provided with the ripple reduction circuit obtained for an output voltage of 35V.

FIG. 10 is a simulation showing the waveforms of the circuit of FIG. 7 provided with the ripple reduction circuit 720. The simulation shows the output voltage Vout, the load current Iout, the control voltage Vc and the voltage across the transistor M1. For an output voltage Vout=35V, the load current Iout has a peak to peak ripple of 30 mA. The voltage Vc is identical to the voltage $V_{M1}$. Therefore the peak-to-peak ripple current is reduced ~80% from originally (30 mA vs 140 mA).

The power converter of the disclosure permits to suppress output ripples from the PFC converter. In addition it can be used over a relatively wide range of output voltages, hence for different load conditions.

The method and corresponding power converter of the disclosure can be used in a variety of applications. For instance the power circuit of the disclosure may be integrated as part of an LED driver.

Figure 11:
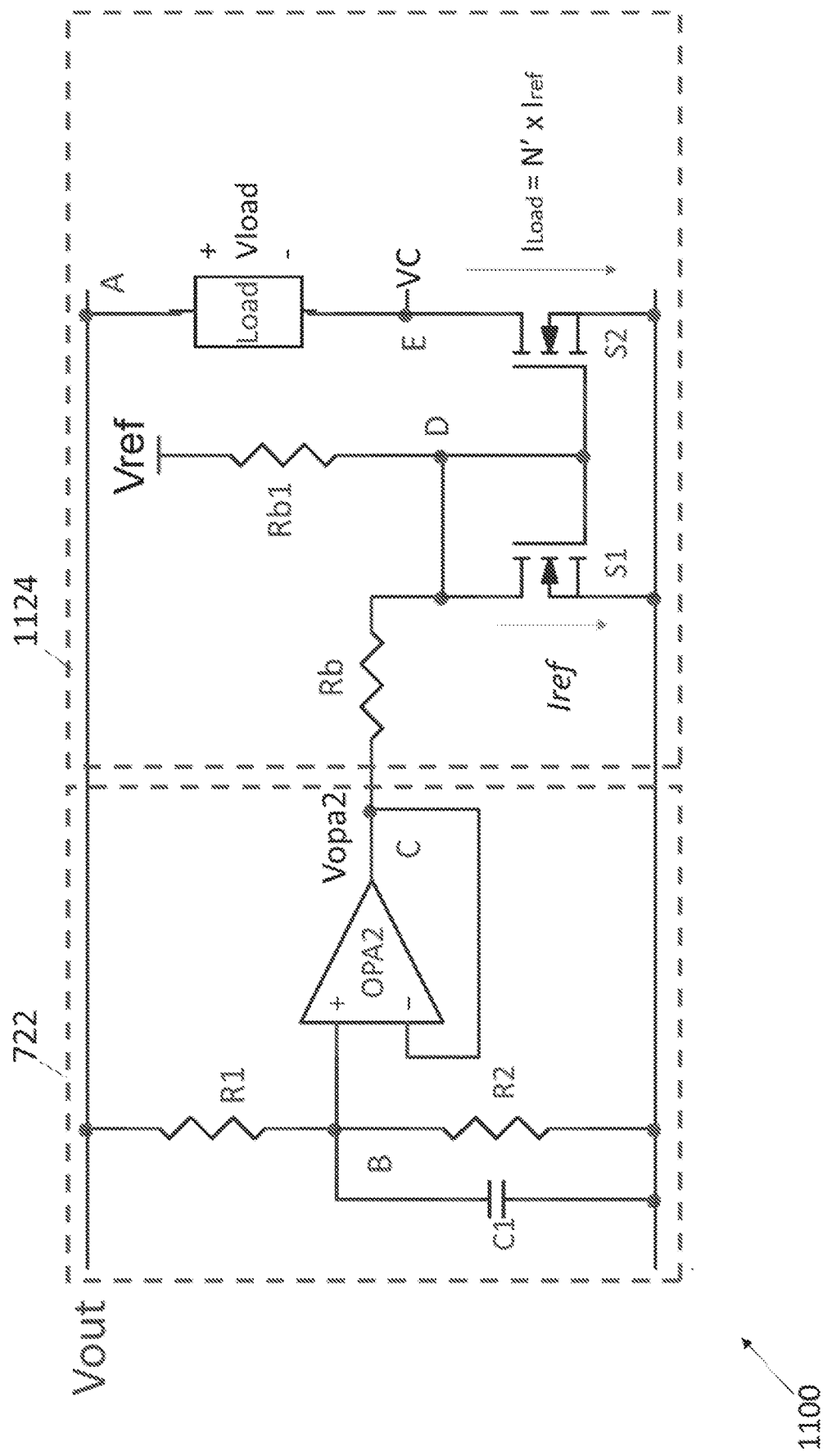
FIG. 11 is a diagram of another ripple reduction circuit.

FIG. 11 is a diagram of another ripple reduction circuit. The ripple reduction circuit 1100 is similar to the ripple reduction circuit of FIG. 7B and the same reference numerals have been used to represent corresponding components. In this example the linear voltage regulator has been removed. The current mirror circuit 1124 is similar to the current mirror 724 but does not include the resistance Rcfg. Instead, the load is provided directly at node E, between Vout and VC. The size ratio of the transistors S1 and S2 can be selected such that the load current $I_{load}$ through S2 is a constant factor N' times the reference current $I_{ref}$ through S1.

Figure 12:
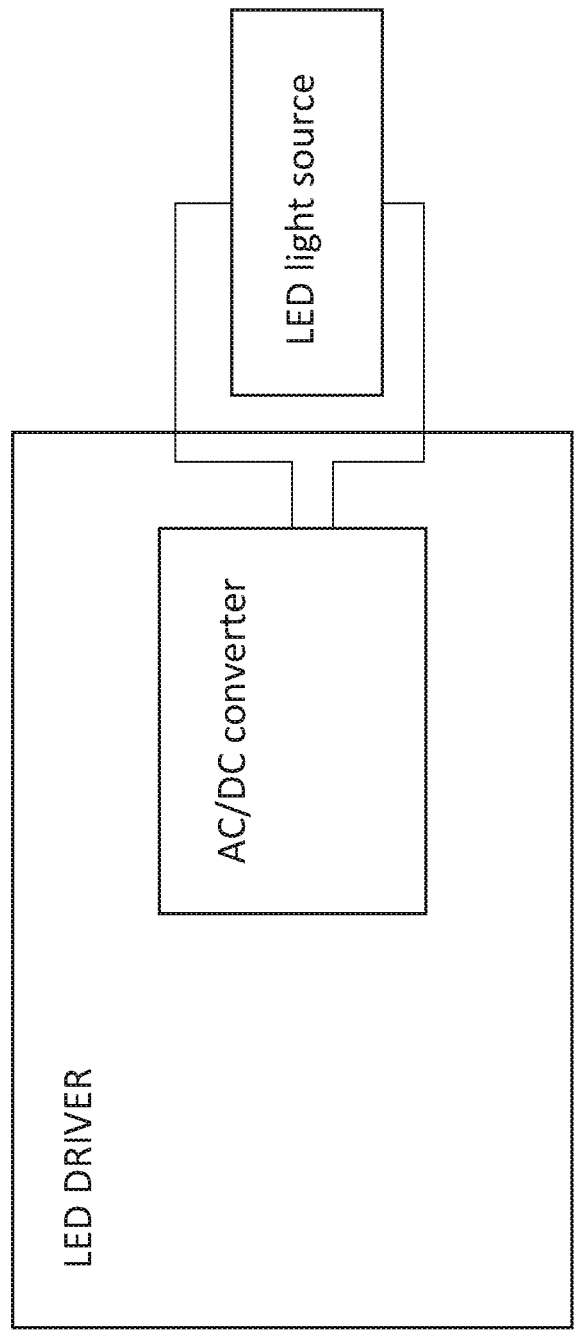
FIG. 12 is a diagram of an LED driver comprising an AC/DC power supply according to the disclosure.

FIG. 12 is a diagram of an LED driver comprising an AC/DC power supply according to the disclosure. In this example the circuit of FIG. 7 is used to power a semiconductor light source such an LED, LED string or an array of LEDs. In operation the ripple voltage across the LEDs is minimised, hence improving the light output. The output voltage may be varied to provide a degree of dimming of the light source. The LED current (load current) may be varied by changing the DC voltage applied across the LEDs.

A skilled person will therefore appreciate that variations of the disclosed arrangements are possible without departing from the disclosure.

Accordingly, the above description of the specific embodiments is made by way of example only and not for the purposes of limitation. It will be clear to the skilled person that minor modifications may be made without significant changes to the operation described.

The invention claimed is:

1. A ripple reduction circuit for use with an AC/DC power supply providing an output voltage to a load, the ripple reduction circuit comprising:
    an input terminal for receiving the output voltage;
    a low pass filter adapted to filter an AC component of the output voltage to obtain a filtered DC voltage; and
    a current mirror circuit adapted to generate a reference current, wherein the reference current is a sum of a first current component and a second current component, wherein the ripple reduction circuit is adapted to generate the reference current based on the filtered DC voltage and to generate a control voltage having an AC component in phase with the AC component of the output voltage.

2. The ripple reduction circuit as claimed in claim 1, wherein the load is provided between a first output terminal and a second output terminal, the ripple reduction circuit comprising a linear voltage regulator adapted to regulate a voltage at the second output terminal based on the control voltage.

3. The ripple reduction circuit as claimed in claim 2, wherein the linear voltage regulator is a low dropout regulator.

4. The ripple reduction circuit as claimed in claim 2, wherein the voltage at the second output terminal is equal to the control voltage.

5. The ripple reduction circuit as claimed in claim 3, wherein the low dropout regulator comprises an operational amplifier coupled to a switch.

6. The ripple reduction circuit as claimed in claim 1, wherein the first current component is fixed, and the second current component is variable based on an output of the low pass filter.

7. The ripple reduction circuit as claimed in claim 1, wherein the current mirror circuit comprises a first switch coupled to the low pass filter via a first resistance and a second switch coupled to the input terminal via a second resistance or via the load.

8. The ripple reduction circuit as claimed in claim 7, wherein the current mirror circuit comprises a third resistance coupled to a voltage source configured to provide a reference voltage, wherein the third resistance is coupled to a control terminal of the first switch and a control terminal of the second switch.

9. The ripple reduction circuit as claimed in claim 1, wherein the low pass filter has a time constant greater than a predetermined ripple period of the output voltage.

10. An AC/DC power supply comprising a power factor correction converter coupled to a ripple reduction circuit as claimed in claim 1.

11. The AC/DC power supply as claimed in claim 10, wherein the power factor correction converter comprises a rectifier coupled to transformer having a primary winding and a secondary winding, a switch coupled to the primary winding and a power factor controller coupled to the switch, wherein the power factor correction converter is operable in at least one of a constant voltage mode and a constant current mode.

12. The AC/DC power supply as claimed in claim 11, wherein the power factor correction converter is adapted to provide a variable output voltage.

13. A method for reducing ripples of an AC/DC power supply providing an output voltage to a load, the method comprising:
    receiving the output voltage from the AC/DC power supply;
    filtering with a low pass filter an AC component of the output voltage to obtain a filtered DC voltage;
    using a current mirror circuit, generating a reference current based on the filtered DC voltage wherein the reference current is a sum of a first current component and a second current component; and
    generating a control voltage having an AC component in phase with the AC component of the output voltage.

14. The method as claimed in claim 13, wherein the load is provided between a first output terminal and a second output terminal, the method comprising regulating a voltage at the second output terminal based on the control voltage.

15. The method as claimed in claim 13, wherein the output voltage varies over an output range, and wherein ripples of a load output voltage or a load output current are substantially reduced or cancelled across the output range.

16. The method as claimed in claim 13, wherein the reference current has a first current component and a second current component, wherein the first current component is fixed, and the second current component is variable based on an output of the low pass filter.

17. The method as claimed in claim 13, comprising subtracting the a DC component of the output voltage to obtain the control voltage.

18. The method as claimed in claim 13, comprising generating the control voltage using the reference current and the output voltage.

19. An LED driver comprising an AC/DC power supply wherein the AC/DC power supply comprises a power factor correction converter coupled to a ripple reduction circuit,
the ripple reduction circuit comprising:
an input terminal for receiving an output voltage from the AC/DC power supply;
a low pass filter adapted to filter an AC component of the output voltage to obtain a DC voltage; and
a current mirror circuit adapted to generate a reference current, wherein the reference current is a sum of a first current component and a second current component,
wherein the ripple reduction circuit is adapted to generate the reference current based on the DC voltage and to provide a control voltage having an AC component in phase with the AC component of the output voltage.

\* \* \* \* \*